April 22, 1930.  B. BISCHOF  1,755,910
PUMP AND MOTOR UNIT FOR REFRIGERATING MACHINES
Filed Dec. 26, 1924  2 Sheets-Sheet 1
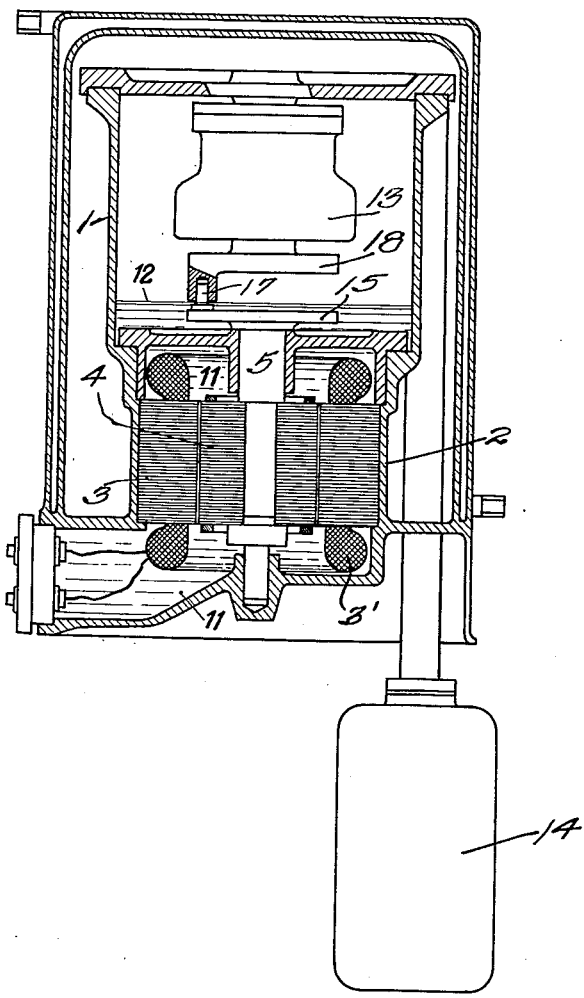

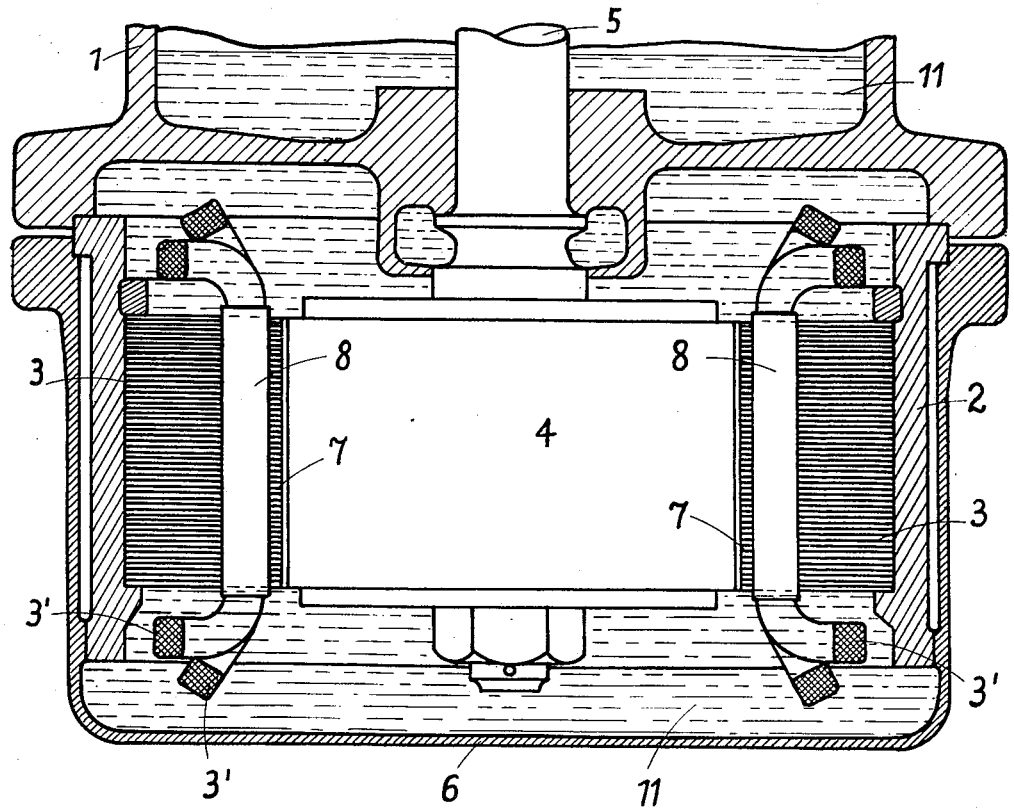

Patented Apr. 22, 1930

1,755,910

UNITED STATES PATENT OFFICE

BERNHARD BISCHOF, OF GENEVA, SWITZERLAND, ASSIGNOR OF ONE-HALF TO CHARLES HACCIUS, OF COLOGNY-GENEVA, SWITZERLAND

PUMP AND MOTOR UNIT FOR REFRIGERATING MACHINES

Application filed December 26, 1924, Serial No. 758,240, and in Switzerland January 2, 1924.

This invention has reference to means adapted to prevent the refrigerant from entering between the windings of electromotors used in refrigerating machines and the like. The sealing of the shaft of the electromotor against contact with the refrigerating gases presents great difficulties in the case of small refrigerating machines, where the manipulation is not always in the hands of specially skilled persons. Refrigerating machines have been suggested heretofore having means intended to dispose of this difficulty, thus for instance a sleeve provided between the stator and rotor of the electromotor so as to cause the rotor to rotate in the gases under pressure, while the stator is surrounded by the atmospheric air. According to another suggestion the entire electromotor is caused to operate in an atmosphere of the refrigerating gases. The mode of construction first mentioned requires that the sleeve disposed between the rotor and stator of the engine is adapted to resist the interior gas pressure, so that one is limited in the selection of the particular refrigerating gases, inasmuch as the thickness of the walls of the sleeve between the stator and the rotor is an essential feature in determining the admissible interior pressure. This thickness of the walls should not exceed a certain maximum to prevent the efficiency coefficient of the motor to be unduly reduced. In view of the necessity of keeping the thickness of the wall comparatively low, this arrangement is restricted to small dimensions of the rotor, that is to say, to small outputs only. On the other hand, the construction in which the motor operates entirely within the refrigerating gases is objectionable, inasmuch as the temperature of the refrigerating gases entering the windings is liable to be reduced to the saturating temperature of the vapors upon the lowering of the temperature of the surrounding outside air, and the then occurring deposits will cause short circuiting in the windings.

It is one of the main objects of the present invention to overcome these difficulties and in view thereof and in accordance with the invention the rotor and the stator of the electromotor are arranged in an insulating liquid, for instance in oil. The windings are thereby exposed to the pressure of the refrigerating gases without producing any contact of said gases with the windings.

The invention will be more fully described with reference to the accompanying drawing, showing by way of example an embodiment of the principles of the invention in sectional view.

Figure 1 is a vertical section.

Figure 2 is a partial vertical section on an enlarged scale.

The motor compressor consists of an electromotor 2 and the compressor 12 of a refrigerating machine. 14 is the evaporator of said refrigerating machine. The electromotor comprises the stator 3 with the windings 3' and the rotor 4 on the shaft 5. Said shaft has a crank disc 15, the pin 16 of said crank disc is embraced by the hollow pin 17 of a crank disc 18 connected to the shaft 19 of the compressor 13. The entire electromotor is surrounded by the casing 6 adapted to tightly protect the electromotor from the outer atmosphere. The interior of this casing 6 is in communication with the interior of the compressing machine, so that the same pressure prevails at all points. In order to prevent the windings 3' from coming in contact with the refrigerant, the entire electromotor with the inclusion of the rotor is mounted in a bath of liquid 11 which preferably consists of a suitable kind of oil.

The electromotor is arranged at the lowest point of the refrigerating machine so that the oil will always flow into the space where the motor is situated. The lowest part of the casing 1 is also filled with the liquid 11. It is moreover recommendable to keep the space containing the motor, and which is completely filled with oil, separate from the other portions of the refrigerating machine, and in such a manner that the motor shaft projects through a suitable bearing from the motor casing. By this means the important result is accomplished that any violent whirling motion of the oil in the compressor space of the refrigerating machine does not extend into the motor chamber, which would be liable to destroy the windings therein, while on the other hand the advantage is produced that a balancing of the oil pressure takes place by way of a channel of very small section, such as represented by the bearing as an instance. This arrangement, moreover, is also operative in preventing according to well known principles the entrance of excessively large quantities of refrigerating gases along with the oil into the motor chamber.

While the invention has been described with reference to forms of exemplification giving satisfactory and reliable results, it is to be understood that the invention is susceptible of other modifications and changes in various particulars without departing from the spirit or scope of the invention, as defined in the claims hereunto appended.

I claim:—

1. In a motor compressor unit, the combination of a motor having a rotor and a stator, said motor being arranged with its shaft vertical, compressing means, a casing entirely enclosing said motor and the compressing means, said casing having an upper and a lower bearing for said shaft, said upper bearing of said motor and the upper part of said casing forming a chamber, the upper end of the shaft projecting beyond said bearing into the chamber, said rotor and said stator being entirely surrounded by oil.

2. In a motor compressor unit, the combination of a motor having a rotor and a stator, said motor being arranged with its shaft vertical, compressing means, a casing entirely enclosing said motor, a lower bearing in said casing, an upper bearing held by said casing, said casing projecting beyond said upper bearing and forming a chamber with said upper bearing, the upper end of the shaft projecting through said upper bearing into said chamber, said casing enclosing the motor being entirely filled with oil.

3. In a motor compressor unit, the combination of a motor having a rotor and a stator, said motor being arranged with its shaft vertical, compressing means, a casing entirely enclosing said motor, a lower bearing in said casing, an upper bearing held by said casing, said casing projecting beyond said upper bearing and forming a chamber with said upper bearing, the upper end of the shaft projecting through said upper bearing into said chamber, said casing enclosing the motor being entirely filled with oil, and oil in said chamber.

4. In a motor compressor unit, the combination of a casing provided with upper and lower chambers formed by a transverse member provided with a bearing opening therein, a motor in said lower chamber, the shaft of said motor projecting through said bearing opening, compressing means located in said upper chamber and operatively connected to the shaft of said motor, oil entirely filling the lower chamber whereby a balancing of the oil pressure is maintained and large quantities of gases are prevented from injuring the windings of said motor.

5. In a motor compressor unit, the combination of a motor having a rotor and a stator, said motor being arranged with its shaft vertical, compressing means, a casing entirely enclosing said motor, said casing being filled with oil, a lower bearing in said casing, and an upper bearing held by said casing, said casing projecting beyond said upper bearing and forming a chamber with said upper bearing, the upper end of the shaft projecting through said upper bearing into said chamber.

6. In a motor compressor unit, the combination of a motor having a shaft, compressing means driven by said motor, a casing enclosing said motor, oil in said casing, said casing projecting beyond the shaft of the motor forming a chamber for the compressing means, and said oil acting to seal the shaft.

7. In a motor compressor unit, the combination of a compressing chamber to contain a driven element, a motor chamber having a gas permeable connection with said compression chamber, a motor in said motor chamber having a shaft projecting into said gas filled chamber, and a filling fluid inert to the components of the atmosphere of said compressing chamber immersing the conductive elements of said motor, and sealing it against the entrance of gas from said compressing chamber.

8. In a motor compressor unit, the combination of a compressing chamber to contain a driven element, a motor chamber below and having a gas permeable connection with said compressing chamber, a motor in said motor chamber and a body of oil filling said motor chamber, immersing the conductive elements of said motor, and sealing it against the entrance of gas from said compressing chamber.

9. In a motor compressor unit, the combination of a compressing chamber for driven elements, a motor chamber below said compressing chamber, said motor chamber having a shaft projecting upwardly into said compressing chamber, said chambers having communication with each other about said shaft and a body of oil filling said chamber, immersing the conductive parts of said motor, and sealing it against contact with gas from said compressing chamber.

In testimony whereof I have signed my name to this specification.

BERNHARD BISCHOF.